United States Patent [19]

Gibo

[11] Patent Number: 5,076,994
[45] Date of Patent: Dec. 31, 1991

[54] LOCK ASSEMBLY FOR A CONTROL ROD DRIVE

[75] Inventor: Edward Y. Gibo, San Jose, Calif.

[73] Assignee: General Electric Company, San Jose, Calif.

[21] Appl. No.: 664,003

[22] Filed: Mar. 4, 1991

[51] Int. Cl.$^5$ .............................................. G21C 7/14
[52] U.S. Cl. ................................... 376/232; 376/235; 376/242
[58] Field of Search ............... 376/232, 237, 235, 242, 376/224, 227, 226; 371/230

[56] References Cited

U.S. PATENT DOCUMENTS

| | | | |
|---|---|---|---|
| 2,080,544 | 5/1937 | Naugler | 192/148 |
| 3,278,385 | 11/1966 | Dufrane | 376/232 |
| 3,410,381 | 11/1968 | Henshaw et al. | 192/148 |
| 3,785,923 | 1/1974 | Bratoljic et al. | 376/227 |
| 3,945,514 | 3/1976 | Dose | 214/27 |
| 3,965,757 | 6/1976 | Barrus | 376/232 |
| 4,015,696 | 4/1977 | Lichti | 188/189 |
| 4,044,622 | 8/1977 | Matthews | 74/424.8 R |
| 4,119,310 | 10/1978 | Trubody | 272/33 R |
| 4,238,288 | 12/1980 | Anikin et al. | 376/232 |
| 4,293,381 | 10/1981 | Goetzmann et al. | 376/232 |
| 4,423,002 | 12/1983 | Wiart et al. | 376/227 |
| 4,518,559 | 5/1985 | Fischer et al. | 376/232 |
| 4,624,825 | 11/1986 | Martin et al. | 376/227 |
| 4,661,307 | 4/1987 | Guillot | 376/232 |

Primary Examiner—Brooks H. Hunt
Assistant Examiner—Frederick H. Voss
Attorney, Agent, or Firm—Robert R. Schroeder

[57] ABSTRACT

A lock assembly is disclosed for selectively preventing rotation of a shaft, such as a shaft used in a control rod drive for a nuclear reactor. The lock assembly includes a stationary housing for receiving the shaft, and a gear fixedly joined to the shaft. The gear includes a plurality of circumferentially spaced gear teeth. An elongate key is slidably joined to the housing and has at least one locking tooth facing the gear teeth. The key is selectively positionable in an engaged position wherein the locking tooth and gear teeth prevent rotation of the shaft in a first direction, and in a disengaged position for allowing the shaft to rotate without obstruction between the gear teeth and the locking tooth.

7 Claims, 4 Drawing Sheets

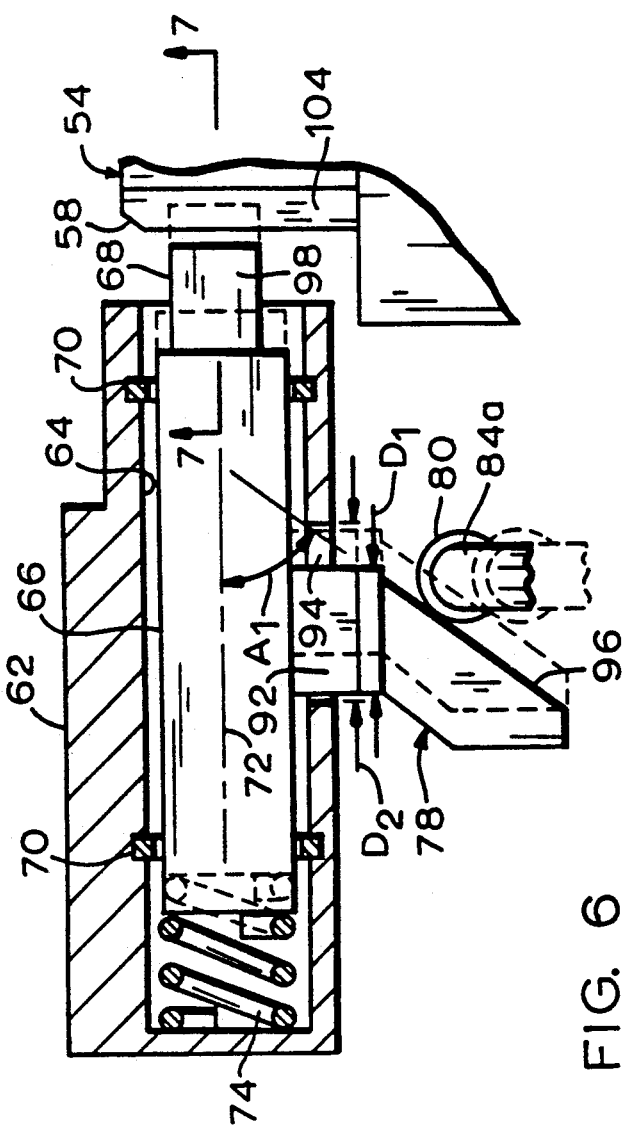
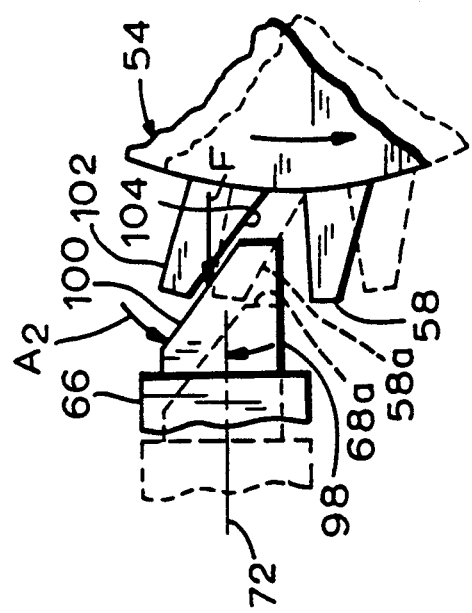
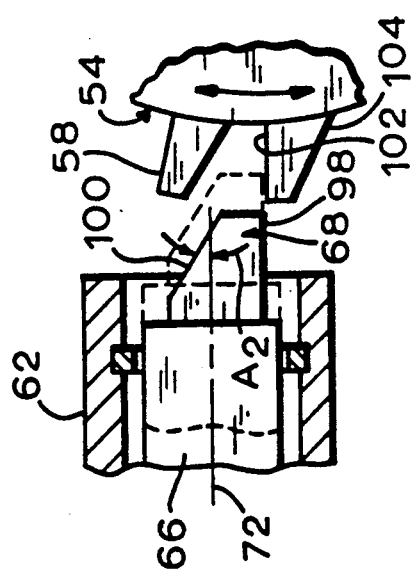
FIG. 6
FIG. 8
FIG. 7

LOCK ASSEMBLY FOR A CONTROL ROD DRIVE

TECHNICAL FIELD

The present invention relates generally to control rod drives used in nuclear reactors and, more specifically, to a lock assembly effective for preventing rotation of the control rod drive when actuated.

BACKGROUND ART

In one type of nuclear reactor, control rods are selectively inserted and withdrawn from a nuclear reactor vessel for controlling the operation thereof. Each of the control rods is typically positioned by a conventional control rod drive which includes a ball screw or spindle threadingly engaging a ball nut for raising and lowering the ball nut as the spindle is rotated either clockwise or counterclockwise. A hollow piston rests upon the ball nut at one end thereof and at its other end is conventionally joined to the control rod. Displacement of the ball nut provides displacement of the piston which in turn inserts or withdraws the control rod in the reactor vessel.

In order to achieve faster insertion of the control rod than could be obtained by normal rotation of the ball spindle, which is conventionally referred to as a scram operation, a rapid flow of high-pressure water is injected through the control rod drive past the piston for lifting the piston off the ball nut in a relatively short time for quickly inserting the control rod into the reactor vessel. The high-pressure water is channeled to the control rod drive through a scram line pipe attached to a high-pressure water accumulator.

In one type of occurrence which allows for rapid backflow of the water past the piston, due to, for example, a break in the scram line, the backflow may cause a large reverse pressure on the piston which in turn provides a back force on the control rod ball nut. This back force can cause reverse rotation of the ball spindle with corresponding withdrawal of the control rod. Withdrawal of one of the control rods due to such a backflow occurrence may cause damage to adjacent fuel in the reactor vessel, requiring replacement thereof leading to undesirable down time of the reactor and economic losses.

In order to prevent the above occurrence, a conventional electromechanical brake is provided in the control rod drive for holding the ball spindle from rotating unless the brake is energized. The brake is sized for restraining rotation of the ball spindle against such forces due to backflow of water over the piston when the control rod drive motor is not operating. And, when the control rod drive motor is operating, the motor itself is sized for providing adequate torque for resisting the forces due to the backflow of water in the event of the above-described occurrence.

To ensure operability of the brake, the brake is periodically tested. However, the brakes are located adjacent to the reactor vessel, which is inaccessible during operation of the reactor due to the radiation field emanating from the reactor vessel. The radiation field continues at reduced levels also during shutdown of the reactor, which would require inspectors to wear suitable protective clothing and limit their time in the area. In one nuclear reactor embodiment, there are about 205 control rod drives, including a respective number of brakes, which would necessarily require a substantial amount of time for testing all of the brakes. Testing of the brakes during reactor shutdown would, therefore, be relatively costly to accomplish, which is additionally economically undesirable since the reactor is not operating for producing power.

Since conventional electromechanical brakes typically utilize braking pads for restraining rotation of a rotor disc, they are subject to slippage. Slippage can result in undesirable partial withdrawal of the control rod during backflow occurrence, and also requires additional means for effectively testing the torque-resisting capability of the brake.

OBJECTS OF THE INVENTION

Accordingly, one object of the present invention is to provide a new and improved lock assembly for preventing rotation of a shaft.

Another object of the present invention is to provide a lock assembly effective for providing a positive rotational restraint of the shaft in one direction while allowing rotation in an opposite direction.

Another object of the present invention is to provide a relatively simple and compact lock assembly for a shaft.

Another object of the present invention is to provide a lock assembly for preventing rotation of a control rod drive for a nuclear reactor and which may be actuated and tested remotely therefrom.

DISCLOSURE OF INVENTION

A lock assembly is disclosed for selectively preventing rotation of a shaft, such as a shaft used in a control rod drive for a nuclear reactor. The lock assembly includes a stationary housing for receiving the shaft, and a gear fixedly joined to the shaft. The gear includes a plurality of circumferentially spaced gear teeth. An elongate key is slidably joined to the housing and has at least one locking tooth facing the gear teeth. Means are provided for selectively positioning the key in an engaged position wherein the locking tooth and gear teeth prevent rotation of the shaft in a first direction, and in a disengaged position for allowing the shaft to rotate without obstruction between the gear teeth and the locking tooth.

BRIEF DESCRIPTION OF THE DRAWINGS

The novel features believed characteristic of the invention are set forth and differentiated in the claims. The invention, in accordance with preferred and exemplary embodiments, together with further objects and advantages thereof, is more particularly described in the following detailed description taken in conjunction with the accompanying drawing in which:

FIG. 6 is an enlarged longitudinal sectional view of a portion of the lock assembly illustrated in FIG. 3.

FIG. 7 is an enlarged transverse sectional view of the mating gear and locking teeth of the lock assembly illustrated in FIG. 6 taken along line 7—7.

FIG. 8 is an enlarged view of the mating gear and locking teeth illustrated in FIG. 7 showing counterclockwise operation of the engaged teeth.

MODE(S) FOR CARRYING OUT THE INVENTION

Figure 1:
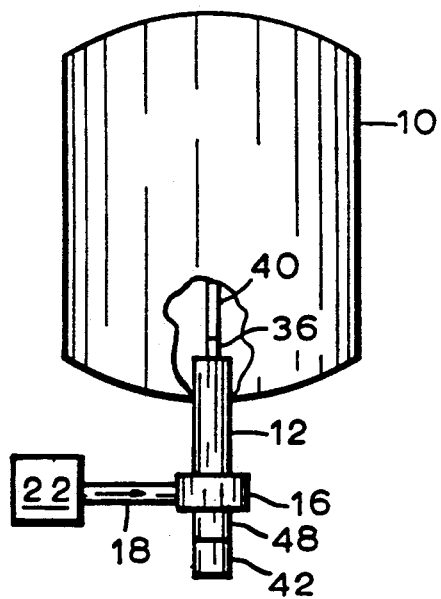
FIG. 1 is a schematic representation of a nuclear reactor vessel including a control rod drive having a lock assembly in accordance with one embodiment of the present invention.
Figure 2:
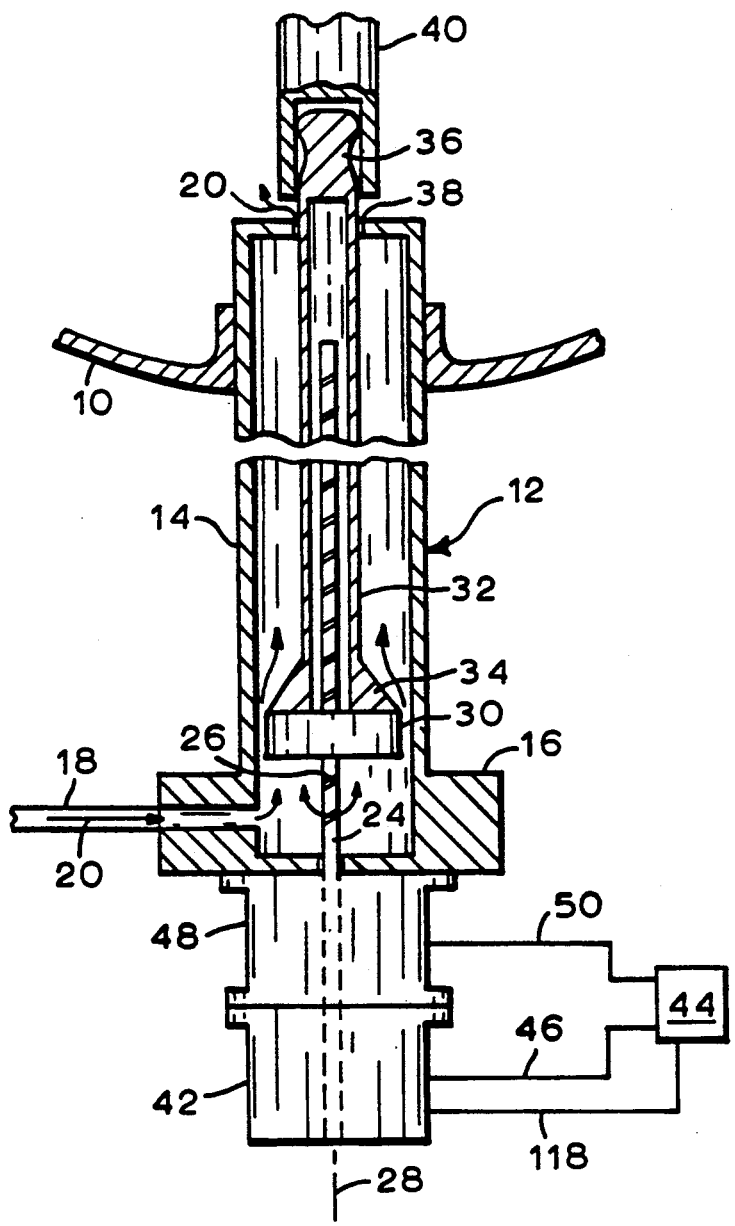
FIG. 2 is an enlarged longitudinal sectional view, partly schematic, of the control rod drive illustrated in FIG. 1.

Illustrated in FIG. 1 is an exemplary nuclear reactor vessel 10 having a plurality of fine motion control rod drives 12 (FMCRD), only one of which is shown. In one exemplary embodiment, there are 205 FMCRDs 12 extending into the vessel 10 through the bottom thereof. Referring also to FIG. 2, an enlarged, sectional view of one of the control rod drives 12 is illustrated. The rod drive 12 includes a tubular housing 14 extending outwardly from the vessel 10 and conventionally secured thereto. The housing 14 is conventionally connected to a flanqe or manifold 16 which is disposed in flow communication with a scram line or conduit 18 which is conventionally selectively provided with high-pressure water 20 from a conventional high-pressure water accumulator 22 conventionally joined to the scram line 18.

Conventionally disposed inside the housing 14 is a conventional ball screw or spindle 24, which in this exemplary embodiment includes conventional right-handed threads 26. The control rod drive 12 includes a longitudinal centerline axis 28, with the housing 12 and spindle 24 being disposed coaxially therewith.

A conventional ball nut 30 is positioned over the spindle 24 and is conventionally restrained from rotating therewith so that as the spindle is rotated in a clockwise direction, the ball nut is translated in a downward direction away from the vessel 10, and when the spindle is rotated in a counterclockwise direction, the ball nut 30 is translated in an upward direction toward the vessel 10. A conventional hollow, elongate piston 32 is disposed coaxially with the spindle 24 and includes a conical base end 34 which rests on the ball nut 30, and a tip end 36 extending through a central aperture 38 in the outer end of the housing 14 into the vessel 10. The tip end 36 is conventionally coupled to a respective control rod 40 by a bayonet coupling, for example.

The spindle 24 extends downwardly from the manifold 16 through a conventional electrical motor 42 which selectively rotates the spindle 24 in either the clockwise direction or counterclockwise direction. The motor 42 is electrically connected to a conventional control 44 by a conventional electrical line 46 for selectively controlling operation of the motor 42.

In accordance with the preferred embodiment of the present invention, the rod drive 12 further includes a lock assembly 48 joined between the manifold 16 and the motor 42, into which assembly 48 extends the spindle 24, also referred to as an input shaft 24. The lock assembly 48 is electrically joined to the control 44 by a conventional electrical line 50 for selectively locking and unlocking, or releasing, the input shaft 24.

Figure 3:
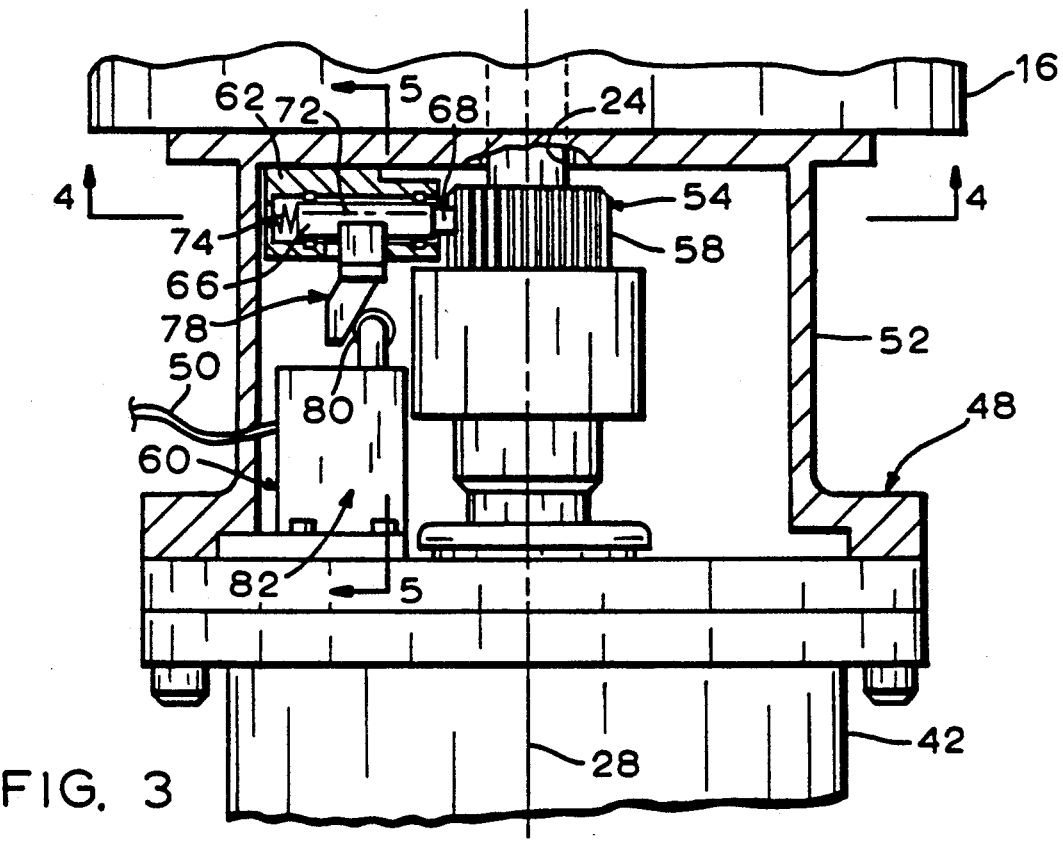
FIG. 3 is an enlarged longitudinal sectional view of the lock assembly illustrated in FIG. 2, shown in an engaged position, in accordance with one embodiment of the invention.
Figure 4:
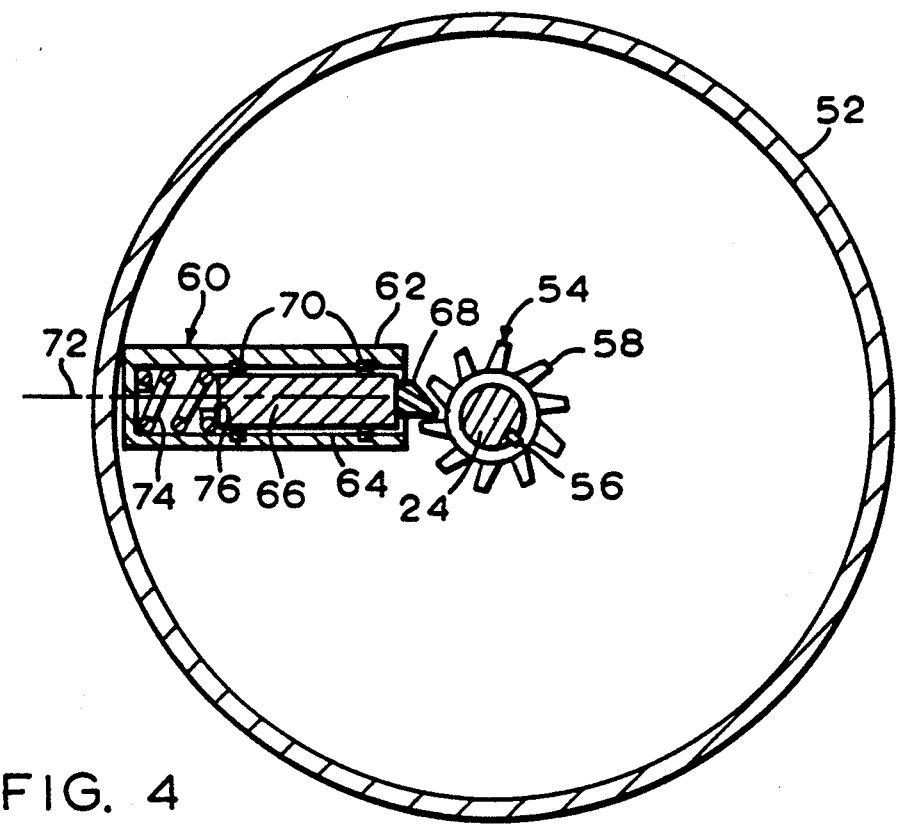
FIG. 4 is a transverse sectional view of the lock assembly shown in FIG. 3 taken along line 4—4.

Illustrated in more particularity in FIGS. 3 and 4 is the lock assembly 48 which includes a stationary tubular housing 52 conventionally fixedly joined to the manifold 16, and to which housing 52 is also conventionally fixedly joined the motor 42 therebelow. The housing 52 surrounds a portion of the shaft 24 which extends from the manifold 16 and to the motor 42. A gear 54 is conventionally fixedly joined to the shaft 24 in the housing 52, by a shaft key 56 for example, for rotation therewith. The gear 54 includes a plurality of circumferentially spaced gear teeth 58.

A key assembly 60 includes a key housing or support 62 conventionally fixedly joined to the housing 52, by bolts for example, and having an elongate guide hole 64 which extends toward the gear teeth 58 in a plane generally perpendicular to the centerline axis 28. Slidably disposed in the guide hole 64 is a translatable elongate key 66 which has a locking tooth 68 at the distal end thereof disposed adjacent to the gear 54. The key 66 may be conventionally lubricated in the guide hole 64 to allow relatively free translation therein. For example, a pair of conventional low-friction rings 70 may be suitably secured in the key support 62 and spaced longitudinally relative to a longitudinal axis 72 of the key 66 for suspending the key 66 within the guide hole 64. The rings 70 may be formed from conventional polytetraflouroethylene (PTFE). Alternatively, conventional roller bearings could be used instead of the rings 70 for slidably supporting the key 66.

A conventional first compression spring 74 is suitably disposed in the guide hole 64 in abutting contact with a proximal end 76 of the key 66 for generating a force for translating, or returning, the key 66 in the guide hole 64 toward the gear 54.

A cam finger 78 is fixedly joined to the key 66 and extends transversely outwardly therefrom and generally perpendicularly to the longitudinal axis 72. A cam roller 80 is disposed adjacent to the cam finger 78 and means 82 for selectively translating or moving the cam roller 80 against the cam finger 78 are fixedly attached to the lower portion of the housing 52 by bolts, for example. The moving means 82 is effective for translating the key 66 in the guide hole 64 for positioning the key 66, including the locking tooth 68, in an engaged position shown in solid line in FIGS. 3 and 4 in abutting contact with one of the gear teeth 58 for preventing rotation of the gear 54 and the shaft 24 in a first, clockwise, direction; and in a disengaged position, shown in solid line in FIGS. 6 and 7, spaced outwardly from the gear teeth 58 for allowing unrestricted rotation of the gear 54 and shaft 24 in the first, clockwise direction, and in a second, counterclockwise direction, opposite to the first direction.

Figure 5:
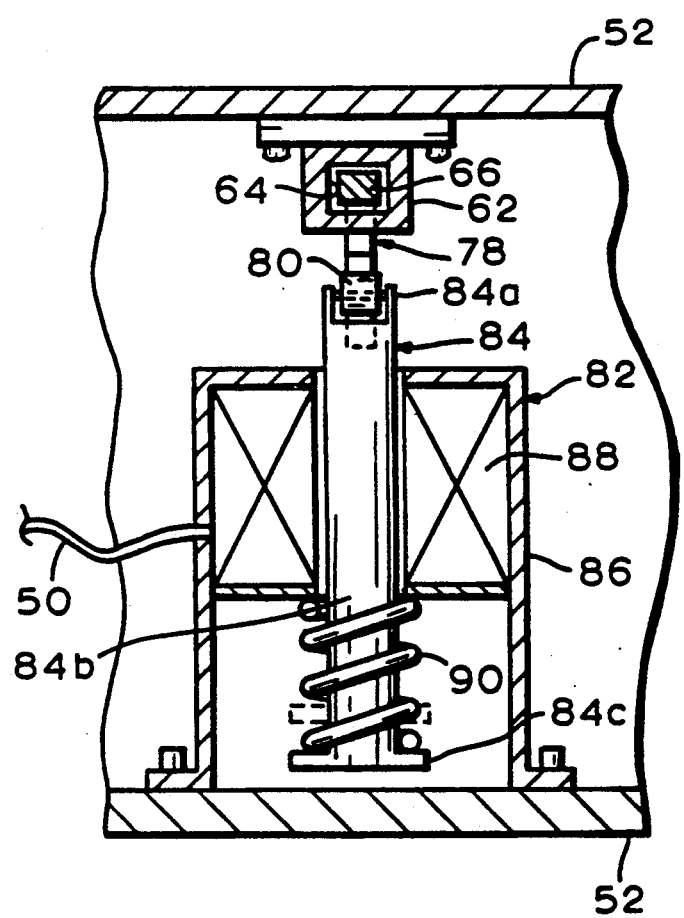
FIG. 5 is an axial transverse sectional view of the lock assembly illustrated in FIG. 3 taken along line 5—5.

As illustrated in FIG. 5, the cam roller moving means 82 in accordance with one embodiment of the present invention includes an elongate plunger 84 having a distal end 84a, conventionally rotatably joined to the cam roller 80; an intermediate portion 84b; and a proximal end 84c. A stationary actuator housing 86 surrounds the plunger intermediate portion 84b and the proximal end 84c and is conventionally fixedly joined to the lock assembly housing 52 by bolts for example. A conventional electrical solenoid 88 is suitably fixedly disposed in the actuator housing 86 and surrounds the plunger intermediate portion 84b. The electrical line 50 joins the control 44 to the solenoid 88 for providing power thereto. A second compression spring 90 is disposed between the solenoid 88 and the plunger proximal end 84c, which is in the form of an enlarged disc, for generating a force for retracting the plunger 84 away from the cam finger 78.

The solenoid 88 is selectively energizable by the control 44 for magnetically drawing the plunger 84 toward the cam finger 78 and further compressing or loading the second spring 90 (as shown in dashed line in FIG. 5), and in turn translating the key 66 away from the gear 54 and further compressing or loading the first spring 74 for moving the key 66 to the disengaged position (as shown in FIG. 6). The solenoid 88 may also be deenergized by the control 44 for allowing the second spring 90 to draw the plunger 84 away from the cam finger 78 and in turn allowing the first spring 74 to urge the key 66 toward the gear 54 for moving the key 66 to the engaged position.

More specifically, FIGS. 6 and 7 illustrate, in solid line, the disengaged position of the key 66 with the locking tooth 68 retracted away from the gear teeth 58, and, in dashed line, the engaged position of the key 66 with the locking tooth 68 disposed in abutting contact with one of the gear teeth 58. The cam finger 78 preferably includes a base 92 fixedly or integrally joined to the key 66 and extending through an access hole 94 in the key support 62. The cam finger 78 also includes a flat cam surface 96 inclined relative to the key longitudinal axis 72 at a first acute angle A which may be about 45°, for example, and disposed adjacent to the cam roller 80 for being moved by the roller 80 for positioning the locking tooth 68 in the disengaged position.

As described above, in this embodiment of the present invention, when the solenoid 88 is energized, the plunger 84 and the cam roller 80 attached thereto is urged upwardly against the cam surface 96 which forces the cam surface 96 to move transversely relative to the direction of movement of the plunger 84 which in turn causes the key 66 to slide in the guide hole 64 toward the left as illustrated in FIG. 6 away from the gear 54 to disengage the locking tooth 68 from the gear tooth 58. When the solenoid 88 is deenergized, the second spring 90 causes the plunger 84 to be withdrawn, or move in a direction away from the cam surface 96, with the first spring 74 then causing the key 66 to be returned to the engaged position with the locking tooth 68 abutting against one of the gear teeth 58. Since the second spring 90 retracts the plunger 84, the cam surface 96 is free to translate toward the roller 80, or to the right as illustrated in FIG. 6 without restriction by the cam roller 80.

In the preferred embodiment of the present invention as illustrated in FIG. 6, the cam finger base 92 has a first diameter $D_1$ and the access hole 94 has a second diameter $D_2$ which is greater than the first diameter $D_1$ for predeterminedly limiting travel of the key 66 between the engaged and disengaged positions. For example, as illustrated in FIG. 6, the key 66 is shown in its disengaged position with the base 92 abutting the left side of the access hole 94 and being spaced away from the right side of the access hole 94. This limits the retraction travel of the key 66. When the key 66 is disposed in its engaged position as shown in dashed line in FIG. 6, the base 92 abuts against the right side of the access hole 94 for limiting the insertion travel of the key 66 for predeterminedly positioning the locking tooth 68 relative to the gear teeth 58. Accordingly, excess retraction or insertion of the locking tooth 68 may be prevented by the preferred arrangement of the cam finger base 92 within the access hole 94.

Referring again to FIGS. 6 and 7, the locking tooth 68 preferably includes a straight locking surface 98 and an inclined cam surface 100 disposed at a second acute angle $A_2$ relative to the key longitudinal axis 72. Each of the gear teeth 58 is preferably complementary in shape to the locking tooth 68 and includes a straight locking surface 102 and an inclined cam surface 104. In the engaged position as illustrated in dashed line in FIG. 7, the locking surfaces 98 and 102 are disposed generally parallel with the key longitudinal axis 72 for preventing rotation of the gear 54 in the first, clockwise direction.

The cam surfaces 100 and 104 of the locking tooth 68 and the gear teeth 58 are preferably inclined at the same second angle $A_2$ relative to the key longitudinal axis 72 in the engaged position as illustrated in more particularity in solid line in FIG. 8 so that rotation of the gear 54 in the second, counterclockwise direction causes the gear tooth cam surface 104 to generate a longitudinal component of force F and slide against and translate the locking tooth cam surface 100 outwardly away from the gear tooth 58 for intermittently freeing successive gear teeth 58 as the gear 54 rotates in the counterclockwise direction. The first spring 74 is therefore further compressed by the gear 58 pushing the key 66 further into the guide hole 64 which thus allows the gear 58 to rotate in the counterclockwise direction even though the key 66 is disposed in its engaged position.

In this operation of the key 66 and the gear 54, the gear 54 will urge the key 66 partially into the guide hole 64 until the tip of one gear tooth 58 is allowed to pass over the tip of the locking tooth 68 as shown in dashed line in FIG. 8 and designated 58a and 68a, respectively. However, as soon as one of the gear teeth 58 passes by the tip of the partially compressed locking tooth 66, the first spring 74 returns the key and locking tooth 68 to the fully engaged position with the locking tooth 68 disposed between adjacent ones of the gear teeth 58. This allows the locking surfaces 98 and 102 to face each other and abut each other in the event of any clockwise rotation of the gear 54 for preventing rotation of the gear 54 in that direction.

Accordingly, in the key engaged position, counterclockwise rotation of the gear 54 intermittently displaces the locking tooth 68 from the fully engaged position as the gear 54 rotates in the counterclockwise direction with the locking tooth 68 being repeatedly urged back to its fully engaged position by the first spring 74. In this way, the control rod 40 may be further inserted into the vessel 10 by powering the motor 42 in all situations whether or not the key 66 is positioned in the engaged position.

In the preferred embodiment of the invention disclosed above, the solenoid 88 is first energized to disengage the teeth 58 and 68, then the motor 42 is energized, e.g. at a fraction of a second later, during normal operation to allow the motor 42 to rotate the shaft 24 for positioning the control rod 40 without obstruction by the lock assembly 48. Upon completion of the desired rotation of the motor 42 and positioning of the control rod 40, the motor 42 is deenergized and stopped, and then the solenoid 88 is deenergized so that the locking tooth 68 engages the gear 54. If the shaft 24 then begins to unintentionally rotate, such as for example by the backflow occurrence described above, the shaft 24 will be prevented from rotating in the clockwise direction by engagement of the locking tooth 68 and a respective one of the gear teeth 58. The key 66, therefore, provides a positive lock of the shaft 24 to prevent undesirable rotation thereof, including unintentional withdrawal of the control rod 40 from the reactor vessel 10.

The lock assembly 48 as described above provides a positive lock of the shaft 24 to prevent ejection of the control rod 40 from the vessel 10 and allows for relatively simple testing of the lock assembly 48 itself. More specifically, the assembly 48 may be simply tested by deenergizing the solenoid 88 for engaging the locking tooth 68 with the gear 54 and then energizing the motor 42 for rotating the shaft 24 in a clockwise direction for forcing one of the gear teeth 58 against the locking tooth 68. Since the motor 42 will be unable to rotate the gear tooth 58 past the locking tooth 68 in the clockwise direction, the motor 42 will stall, which may be conventionally observed by the control 44 for indicating the effective operation of the lock assembly 48. If the lock assembly 48 is unable to prevent clockwise rotation of the shaft 24 during testing, the control 44 can provide a suitable indication thereof, which will then result in manual inspection of the lock assembly 48 for correcting any problem that might exist.

In the preferred embodiment of the invention as described above, the lock assembly 48 is positioned between the manifold 16 and the motor 42. Accordingly, the motor 42 may be removed during maintenance, and the lock assembly 48 may be engaged (i.e. de-energized) to prevent clockwise rotation of the shaft 24 during this maintenance operation. Therefore, the lock assembly 48 can replace or duplicate the function of any existing anti-rotation mechanism which is located between the manifold 16 and the motor 42.

Alternatively, the moving means 82, including the solenoid 88, could be mounted to the top of the housing of the motor 42 and extend into position next to the cam finger 78 inside the housing 52. In this way, the moving means 82 may be removed with the motor 42 during maintenance for inspection and any required refurbishment. The locking tooth 68, however, will remain during such maintenance, and be moved by the spring 74 to an engaged position with the gear 54 to prevent rotation of the shaft 24.

While there has been described herein what is considered to be a preferred embodiment of the present invention, other modifications of the invention shall be apparent to those skilled in the art from the teachings herein, and it is, therefore, desired to be secured in the appended claims all such modifications as fall within the true spirit and scope of the invention.

For example, various alternate configurations of the locking tooth 68 and the gear teeth 58 may be utilized for providing the two functions of preventing clockwise rotation of the shaft 24 in the engaged position while allowing intermittent counterclockwise rotation of the shaft 24. Furthermore, although the cam finger 78 and the cam roller moving means 82 are generally colinearly aligned with each other, parallel to the longitudinal centerline axis 28, and perpendicularly to the key 66 for providing a more compact assembly for reducing space requirements thereof, alternate configurations thereof may be utilized for extending and retracting the key 66 as space permits.

Accordingly, what is desired to be secured by Letters Patent of the United States is the invention as defined and differentiated in the following claims:

I claim:

1. A lock assembly for selectively locking and unlocking a shaft for a control rod drive comprising:
   a stationary housing surrounding said shaft;
   a gear fixedly joined to said shaft in said housing and having a plurality of circumferentially spaced teeth;
   a key assembly including:
      a key support fixedly joined to said housing and having an elongate guide hole extending toward said gear teeth;
      a translatable key slidably disposed in said guide hole and having a locking tooth at a distal end thereof disposed adjacent to said gear; and
      a cam finger fixedly joined to said key and extending transversely outwardly therefrom; a cam roller disposed adjacent to said cam finger; and
   means for selectively moving said cam roller against said cam finger for translating said key in said guide hole for positioning said key and locking tooth in an engaged position in abutting contact with one of said gear teeth for preventing rotation of said gear and shaft in a first direction, and in a disengaged position spaced outwardly from said gear teeth for allowing unrestricted rotation of said gear and shaft in said first direction and in a second, opposite, direction.

2. A lock assembly according to claim 1 wherein said key assembly further includes a first spring disposed in said guide hole in abutting contact with a proximal end of said key for generating a force for translating said key in said guide hole toward said gear.

3. A lock assembly according to claim 2 wherein said cam finger includes a base fixedly joined to said key and extending through an access hole in said key support, and a cam surface inclined relative to a longitudinal axis of said key and disposed adjacent to said cam roller for being moved by said roller for positioning said locking tooth in said disengaged position.

4. A lock assembly according to claim 3 wherein said cam finger base has a first diameter, and said access hole has a second diameter greater than said first diameter for limiting travel of said key between said engaged and disengaged positions.

5. A lock assembly according to claim 3 wherein said cam roller moving means include:
   a plunger having a distal end rotatably joined to said cam roller, an intermediate portion, and a proximal end;
   an actuator housing surrounding said plunger intermediate portion and proximal end;
   an electrical solenoid disposed in said actuator housing and surrounding said plunger intermediate portion;
   a second spring disposed between said solenoid and said plunger proximal end for retracting said plunger away from said cam surface; and
   said solenoid being selectively energizable for magnetically drawing said plunger toward said cam surface and loading said second spring and in turn translating said key away from said gear and loading said first spring for moving said key to said disengaged position, and being deenergizable for allowing said second spring to draw said plunger away from said cam surface and in turn allowing said first spring to urge said key toward said gear for moving said key to said engaged position.

6. A lock assembly according to claim 5 wherein:
   said locking tooth has a straight locking surface and an inclined cam surface;
   each of said gear teeth has a straight locking surface and an inclined cam surface; and
   said locking surfaces of said locking tooth and said gear tooth are disposed generally parallel with said key longitudinal axis in said engaged position for preventing rotation of said gear in said first direction.

7. A lock assembly according to claim 6 wherein said cam surfaces of said locking tooth and said gear tooth are inclined relative to said key longitudinal axis in said engaged position so that rotation of said gear in said second direction causes said gear tooth cam surface to slide against and translate said locking tooth cam surface away from said gear tooth for intermittently freeing successive gear teeth as said gear rotates in said second direction while allowing said locking surfaces of said locking tooth and said gear tooth to abut for preventing rotation of said gear in said first direction.

* * * * *